US009223531B2

(12) United States Patent
Yamamoto et al.

(10) Patent No.: US 9,223,531 B2
(45) Date of Patent: Dec. 29, 2015

(54) IMAGE PROCESSING APPARATUS THAT GENERATES REMOTE SCREEN DISPLAY DATA, PORTABLE TERMINAL APPARATUS THAT RECEIVES REMOTE SCREEN DISPLAY DATA, AND RECORDING MEDIUM STORING A PROGRAM FOR GENERATING OR RECEIVING REMOTE SCREEN DISPLAY DATA

(71) Applicant: Konica Minolta, Inc., Tokyo (JP)

(72) Inventors: Kenzo Yamamoto, Aichi (JP); Manabu Furukawa, Kyoto (JP); Akihiko Oda, Aichi (JP); Hiroki Tajima, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/263,298

(22) Filed: Apr. 28, 2014

(65) Prior Publication Data

US 2014/0320918 A1    Oct. 30, 2014

(30) Foreign Application Priority Data

Apr. 30, 2013    (JP) .................................. 2013-096063

(51) Int. Cl.
*G06F 3/12*    (2006.01)
*H04N 1/00*    (2006.01)

(52) U.S. Cl.
CPC ............ *G06F 3/1292* (2013.01); *G06F 3/1204* (2013.01); *G06F 3/1268* (2013.01); *G06F 3/1284* (2013.01); *H04N 1/0035* (2013.01); *G06F 3/121* (2013.01)

(58) Field of Classification Search
CPC . G06F 3/0488; G06F 3/0486; G06F 3/04842; G06F 3/04817

USPC ......... 358/1.15; 715/764, 765, 835, 863, 810, 715/825; 345/173
See application file for complete search history.

(56) References Cited

U.S. PATENT DOCUMENTS

| | | | |
|---|---|---|---|
| 2007/0297017 A1 | 12/2007 | Kashioka | |
| 2010/0216448 A1* | 8/2010 | Jeon et al. | 455/418 |
| 2011/0084925 A1* | 4/2011 | Baik et al. | 345/173 |
| 2012/0180003 A1* | 7/2012 | Sawayanagi et al. | 715/863 |
| 2014/0268232 A1* | 9/2014 | Uchikawa | 358/1.15 |

FOREIGN PATENT DOCUMENTS

| | | |
|---|---|---|
| JP | 2008-005284 A | 1/2008 |
| JP | 2012-064030 A | 3/2012 |
| JP | 2012058839 A | 3/2012 |

OTHER PUBLICATIONS

Decision to Grant a Patent issued in corresponding Japanese Patent Application No. 2013-096063, mailed May 19, 2015 (6 pages).

* cited by examiner

*Primary Examiner* — Jacky X Zheng
(74) *Attorney, Agent, or Firm* — Osha Liang LLP

(57) ABSTRACT

An image processing apparatus includes: a storage that stores one or more files; a connector that connects the image processing apparatus to a portable terminal apparatus, the portable terminal apparatus including a display portion that remotely displays a screen of the image processing apparatus along with one or more application icons representing one or more applications installed on the portable terminal apparatus, the screen having: one or more file buttons and one or more file processing buttons; a receiver that receives display information from the portable terminal; a display data generator that generates remote screen display data on the basis of the display information, by moving the file processing button to a position at which the file processing button would be further away from the application icon; and a transmitter that transmits the remote screen display data to the portable terminal apparatus.

24 Claims, 13 Drawing Sheets

[Software Applications on the Portable Terminal]

Various Software Applications on the Portable Terminal

MFP Cooperation Application on the Portable Terminal
a) Accept user instructions on the portable terminal (Activate an application, for example)
b) Execute operation screen processing (Receive MFP screen display data to display a screen, for example)
c) Execute cooperation-related processing (Transmit operation information and others to the MFP)

OS on the portable terminal

[Software Applications on the MFP]

Various Software Applications on the MFP

Portable Terminal Cooperation Application on the MFP
a) Accept user instructions on the MFP (Activate an application, for example)
b) Execute operation screen processing (Transmit MFP screen display data, for example)
c) Execute cooperation-related processing (Receive operation information and others from the portable terminal to execute a job))

Data Communication

OS on the MFP

FIG. 4

IMAGE PROCESSING APPARATUS THAT GENERATES REMOTE SCREEN DISPLAY DATA, PORTABLE TERMINAL APPARATUS THAT RECEIVES REMOTE SCREEN DISPLAY DATA, AND RECORDING MEDIUM STORING A PROGRAM FOR GENERATING OR RECEIVING REMOTE SCREEN DISPLAY DATA

This application claims priority under 35 U.S.C. §119 to Japanese Patent Application No. 2013-096063 filed on Apr. 30, 2013, the entire disclosure of which is incorporated herein by reference in its entirety.

BACKGROUND OF THE INVENTION

1. Field of the Invention

The present invention relates to: an image processing apparatus such as a multi-function peripheral (MFP), i.e., a multifunctional digital machine; a portable terminal apparatus such as a smartphone or a tablet computer terminal; a recording medium storing a program for the image processing apparatus to execute processing; and a recording medium storing a program for the portable terminal apparatus to execute processing.

2. Description of the Related Art

The following description sets forth the inventor's knowledge of related art and problems therein and should not be construed as an admission of knowledge in the prior art.

In recent years, users can store digital documents on their portable information apparatuses such as smartphones and tablet computer terminals, and even view and edit the stored documents anytime and anywhere they like. After editing a document by their portable terminal apparatuses, users can transmit the document to an image processing apparatus such as an MFP to print by or store on the image processing apparatus. Users also can create a file consisting of image data or other data, by scanning a physical paper document with a scanner of the image processing apparatus, and transmit the file to their portable information apparatuses to edit by their portable information apparatuses.

However, users are bothered by the need to operate different screens on the image processing apparatus and the portable information apparatus, back and forth separately, which is quite troublesome.

As a solution to such a problem, there is a proposed cooperative system including an image processing apparatus and a portable terminal apparatus, which allows users to remotely access functions of the image processing apparatus from the portable terminal apparatus, through an operation screen of the image processing apparatus which is displayed as a remote screen on a display portion of the portable terminal apparatus. In this cooperative system, a remote screen of the image processing apparatus is displayed on the display portion of the portable terminal apparatus on the basis of screen data received from the image processing apparatus.

More specifically, the portable terminal apparatus transmits information indicating performed operations to the image processing apparatus; upon receiving the information, the image processing apparatus generates screen data and transmits it to the portable terminal apparatus; then the portable terminal apparatus displays or updates a remote screen on the basis of the screen data.

The portable terminal apparatus is provided with a touch panel; application icons representing various applications installed on the portable terminal apparatus are shown on the touch panel along with a remote screen of the image processing apparatus.

Furthermore, one or more file buttons each representing a document file stored on the image processing apparatus are shown on the remote screen; thus, users can activate an application to execute processing on a document file, by dragging a file button and dropping it onto an application icon on the remote screen.

However, such a drag-and-drop may cause a problem as described below.

On the remote screen of the image processing apparatus, which is displayed on the portable terminal apparatus, file processing buttons such as a print button, a transmit button, and a delete button are shown along with the file buttons. In many cases, the file processing buttons are arranged on an end of the remote screen in order to prevent erroneous operations; however, the file processing buttons may be arranged very close to the application icons of the portable terminal apparatus.

In such a case, when a user intends to drop a file button onto an application icon on the remote screen, the user may drop it onto a file processing button that is very close to the application icon on the remote screen, by mistake; reversely, when a user intends to drop a file button onto a file processing button, the user may drop it onto an application icon that is very close thereto, by mistake. This causes a problem that wrong processing is executed despite the user's intention. Furthermore, while a fingertip is on a file processing button, a file button may overlap an application icon; in such a case, it may be wrongly judged that the user drops it onto the application icon.

Such a problem as described above tends to be caused especially if the portable terminal apparatus has a small size of display screen.

Japanese Unexamined Patent Publication No. 2012-058839 suggests a technique to reduce the risk of erroneous operations by detecting the number of icons touched by user and enlarging or reducing the icons on the display; and thus users can easily select among them.

However, the portable terminal apparatus is not allowed to control the position of file processing buttons on a remote screen of the image processing apparatus which is displayed on the portable terminal apparatus; therefore, the above-mentioned Japanese Unexamined Patent Publication No. 2012-058839 does not bring a solution to the problem of erroneous operations, which may be caused when a user intends to drop a file button onto a file processing button on the remote screen or onto an application icon of the portable terminal apparatus.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image processing apparatus comprising:
 a storage that stores one or more files;
 a connector that connects the image processing apparatus to a portable terminal apparatus, the portable terminal apparatus comprising a display portion that displays a screen of the image processing apparatus as a remote screen along with one or more application icons representing one or more applications installed on the portable terminal apparatus, the screen having: one or more file buttons representing the one or more files; and one or more file processing buttons allowing execution of file processing when the file button is dropped onto the file processing button, the one or more application icons allowing execution of functions when the file button is dropped onto the application icon;

a receiver that receives display information including display position information of the one or more application icons on the display portion, from the portable terminal that the image processing apparatus is connected to by the connector;

a display data generator that generates remote screen display data on the basis of the display information received by the receiver, by moving the file processing button on the remote screen to a position at which the file processing button would be further away from the application icon; and a transmitter that transmits the remote screen display data generated by the display data generator, to the portable terminal apparatus.

A second aspect of the present invention relates to a portable terminal apparatus comprising:

a display portion that displays a screen of an image processing apparatus as a remote screen along with one or more application icons representing one or more applications installed on the portable terminal apparatus, the screen having: one or more file buttons representing one or more files stored on the image processing apparatus; and one or more file processing buttons allowing execution of file processing when the file button is dropped onto the file processing button, the one or more application icons allowing execution of functions when the file button is dropped onto the application icon;

a connector that connects the portable terminal apparatus to the image processing apparatus;

a receiver that receives remote screen display data and display position information of the one or more file processing buttons on the remote screen, from the image processing apparatus that the portable terminal apparatus is connected to by the connector; and a display controller that allows the display portion to display the remote screen along with the one or more application icons by moving the application icon on the display portion to a position at which the application icon would be further away from the file processing button, on the basis of the display position information of the file processing button which is received by the receiver.

A third aspect of the present invention relates to a non-transitory computer-readable recording medium storing a program of generating remote screen display data to make a computer of an image processing apparatus execute:

connecting the image processing apparatus to a portable terminal apparatus, the portable terminal apparatus comprising a display portion that displays a screen of the image processing apparatus as a remote screen along with one or more application icons representing one or more applications installed on the portable terminal apparatus, the screen having: one or more file buttons representing one or more files stored on a storage; and one or more file processing buttons allowing execution of file processing when the file button is dropped onto the file processing button, the one or more application icons allowing execution of functions when the file button is dropped onto the application icon;

receiving display information including display position information of the one or more application icons on the display portion, from the portable terminal that the image processing apparatus is connected to;

generating remote screen display data on the basis of the display information received therefrom, by moving the file processing button on the remote screen to a position at which the file processing button would be further away from the application icon; and transmitting the generated remote screen display data to the portable terminal apparatus.

A fourth aspect of the present invention relates to a non-transitory computer-readable recording medium storing a display control program to make a computer of a portable terminal apparatus comprising a display portion execute:

connecting the portable terminal apparatus to an image processing apparatus;

receiving remote screen display data and display position information of one or more file processing buttons on a screen of the image processing apparatus that the portable terminal apparatus is connected to, the screen having: one or more file buttons representing one or more files stored on the image processing apparatus; and one or more file processing buttons allowing execution of file processing when the file button is dropped onto the file processing button, the screen to be displayed on the display portion as a remote screen along with one or more application icons representing one or more applications installed on the portable terminal apparatus, the one or more application icons allowing execution of functions when the file button is dropped onto the application icon; and making the display portion display the remote screen along with the one or more application icons by moving the application icon to a position at which the application icon would be further away from the file processing button, on the basis of the display position information of the file processing button which is received.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 illustrates the relationship among application software portions of the image processing apparatus and the portable terminal apparatus;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described in combination with the accompanying drawings.

Figure 1:
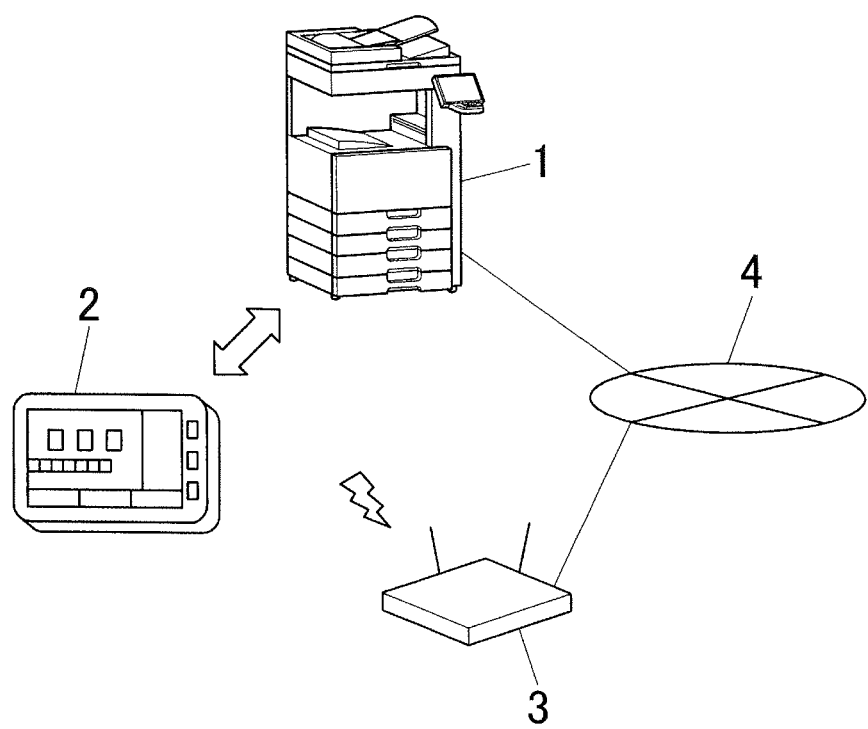
FIG. 1 illustrates a configuration of a cooperative image processing system including a portable terminal apparatus according to one embodiment of the present invention.

FIG. 1 illustrates a configuration of a cooperative image processing system including an image processing apparatus and a portable terminal apparatus according to one embodiment of the present invention.

The cooperative image processing system is provided with an image processing apparatus 1, a portable terminal apparatus 2, and others; the image processing apparatus 1 and the portable terminal apparatus 2 can be connected to each other via a wireless LAN router 3 and a network 4. In this embodiment, they are connected to each other in a wireless manner, although the image processing apparatus 1 and the portable terminal apparatus 2 also can be connected in a wired manner, via an USB interface for example.

In this embodiment, an MFP, which has various functions such as a copier function, a printer function, a scanner function, and a facsimile function, as described above, is employed as the image processing apparatus 1. Hereinafter, the image processing apparatus will also be referred to as "MFP". The portable terminal apparatus will also be referred to as "portable terminal".

Figure 2:
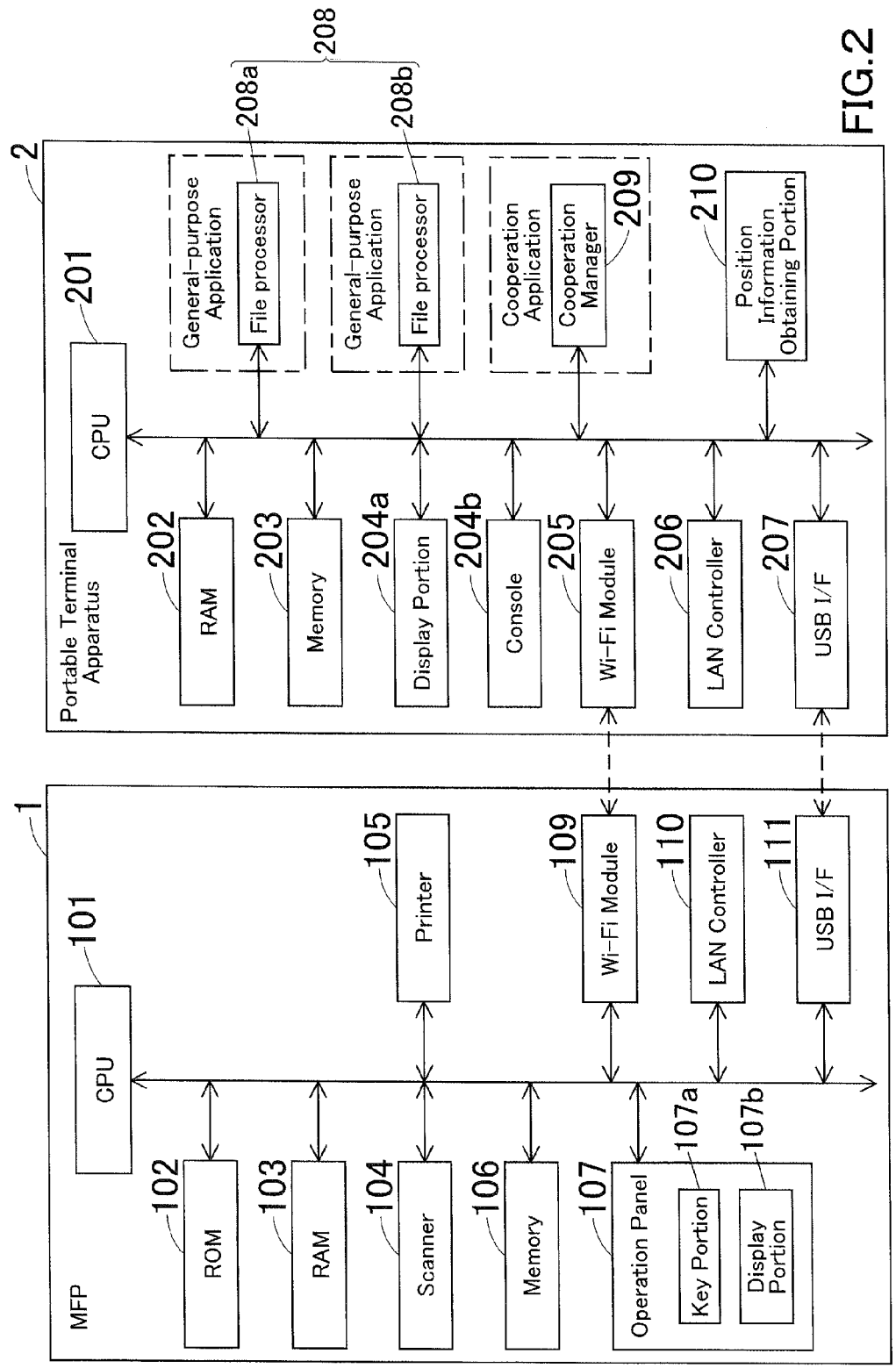
FIG. 2 is a block diagram illustrating an electrical configuration of an image processing apparatus and a portable terminal apparatus.

FIG. 2 is a block diagram illustrating an electrical configuration of the MFP 1 and the portable terminal 2.

The MFP 1 is provided with: a CPU 101; a ROM 102; a RAM 103; a scanner 104; a printer 105; a memory 106; an operation panel 107; a Wireless Fidelity module (Wi-Fi module) 109; a Local Area Network controller (LAN controller) 110; and an USB interface (USB I/F) 111.

The CPU 101 controls the entire MFP 1 in a unified and systematic manner in accordance with operation programs stored on a memory such as the ROM 102. Specifically, in this embodiment, in addition to enabling various functions of the MFP 1, the CPU 101 controls the following operations, for example: transmitting remote screen display data for reproducing an operation screen of the MFP 1 to the portable terminal 2 as requested by the portable terminal 2 so that the operation screen will be displayed on the portable terminal 2; and transmitting remote screen display data for reproducing another operation screen of the MFP 1 in response to user operation on the portable terminal 2 so that the operation screen will be displayed next for job execution.

The ROM 102 is a memory storing operation programs and others for the CPU 101; the RAM 103 is a memory providing a work area for the CPU 101 to execute processing in accordance with operation programs.

The scanner 104 reads images on a document that is put on a platen glass or in an automatic document feeder not shown in the figure and outputs scanned image data that is electronic data.

The printer 105 prints image data of a document scanned by the scanner 104 and print data received from the portable terminal 2 and others, on sheets of paper.

The memory 106, which consists of a hard disk device, stores various types of data, applications, and others. Specifically, in this embodiment, the memory 106 stores screen display data for reproducing various operation screens to be displayed on the operation screen 107; the CPU 101 calls display data for reproducing an appropriate operation screen for the user operation, out of the memory 106, and displays the operation screen on the operation panel 107 or transmits the screen display data to the portable terminal 2. The memory 106 further stores a plurality of files such as document files consisting of images scanned by the scanner 104 and document files received from external apparatuses.

The operation panel 107 allows users to operate the MFP 1 while displaying messages and others thereon. The operation panel 107 is provided with: a keys portion 107a having a Start key and numeric keys; and a display portion 107b consisting of a liquid-crystal display for example, with touch-panel functionality.

The Wi-Fi module 109 is an interface supporting wireless access to the portable terminal 2; the LAN controller 110 controls the communication with external apparatuses such as personal computer terminals and other MFPs.

The USB interface 111 is an interface supporting wired access to the portable terminal 2.

Meanwhile, the portable terminal 2 consists of a smartphone, a tablet computer terminal, electronic paper, and others. The portable terminal 2 is provided with: a CPU 201; a RAM 202; a memory 203; a display portion 204a; a console 204b; a Wi-Fi module 205; a LAN controller 206; an USB interface 207; file processors 208a and 208b; and a cooperation manager 209.

The CPU 201 controls the entire portable terminal 2 in a unified and systematic manner in accordance with an Operating System (OS), which is basic software, and general-purpose applications.

The RAM 202 is a memory providing a work area for the CPU 201 to execute processing in accordance with operation programs.

The memory 203, which consists of a hard disk device, stores various types of data, applications, and others. Specifically, in this embodiment, the memory 203 stores: remote screen display data received from the MFP 1; programs such as a basic OS, a cooperation application, and general-purpose applications; information of display sections and unoccupied display fields of the display portion 204a; and others. Hereinafter, applications also will be referred to simply as "app".

The display portion 204a consists of a liquid-crystal device for example; the console 204b, which is provided on the display portion 204, consists of a touch panel enabling touch input. Generally, touch input is a gesture that defines an operation depending on the number of fingers used and the movement of the fingers. Hera are the following examples of gestures: a flick for scrolling a screen (turning a page and turning a page back); and a pinch-in and a pinch-out for changing the size of an image (enlarging or reducing an image) or rotating an image. Users can drag a file button or a file icon representing a document file and drop it onto a file processing button for executing file processing or an application icon, on a screen.

The Wi-Fi module 205 is an interface for establishing a wireless connection between the MFP 1 and the portable terminal 2; the LAN controller 206 controls communication with external apparatuses such as user terminals. The USB interface 207 is an interface for establishing a wired connection between the MFP 1 and the portable terminal apparatus 2.

The file processors 208a and 208b edit files, transfer files, transmit files by electronic mail, and execute other processing on files. Hereinafter, the file processors 208a and 208b will be referred to as "file processor 208".

The cooperation manager 209 supports access to functions of the MFP 1 in order to achieve smooth functional cooperation between the MFP 1 and the portable terminal 2. More specifically, in order to access functions of the MFP 1 such as a copier function, a printer function, a scanner function, and a facsimile function, the cooperation manager 209 performs the following operations: receiving remote screen display data for reproducing an operation screen displayed on the operation panel 107 of the MFP 1, from the MFP 1; displaying the operation screen as a remote screen on the display portion 204; detecting the coordinate of a touch position when a user presses a button on the remote screen; and transmitting the coordinate to the MFP 1 as operation information. The MFP 1 identifies the user instruction by analyzing the coordinate of the touch position and executes processing accordingly.

The file processor 208 is enabled to execute its functions when the CPU 201 activates a general-purpose application. The general-purpose application is software to enable the file processor 208 to execute processing on various files; there are various types of general-purpose application such as file editing applications, applications having a function of transmitting files by electronic mail; and applications having a function of storing files on a Web server.

The cooperation manager 209 is enabled to execute its functions when the CPU 201 activates a cooperation application. The cooperation application is software to achieve smooth functional cooperation between the MFP 1 and the portable terminal 2. The general-purpose application and the cooperation application are allowed to transfer files to each other and download files from each other.

Figure 3:
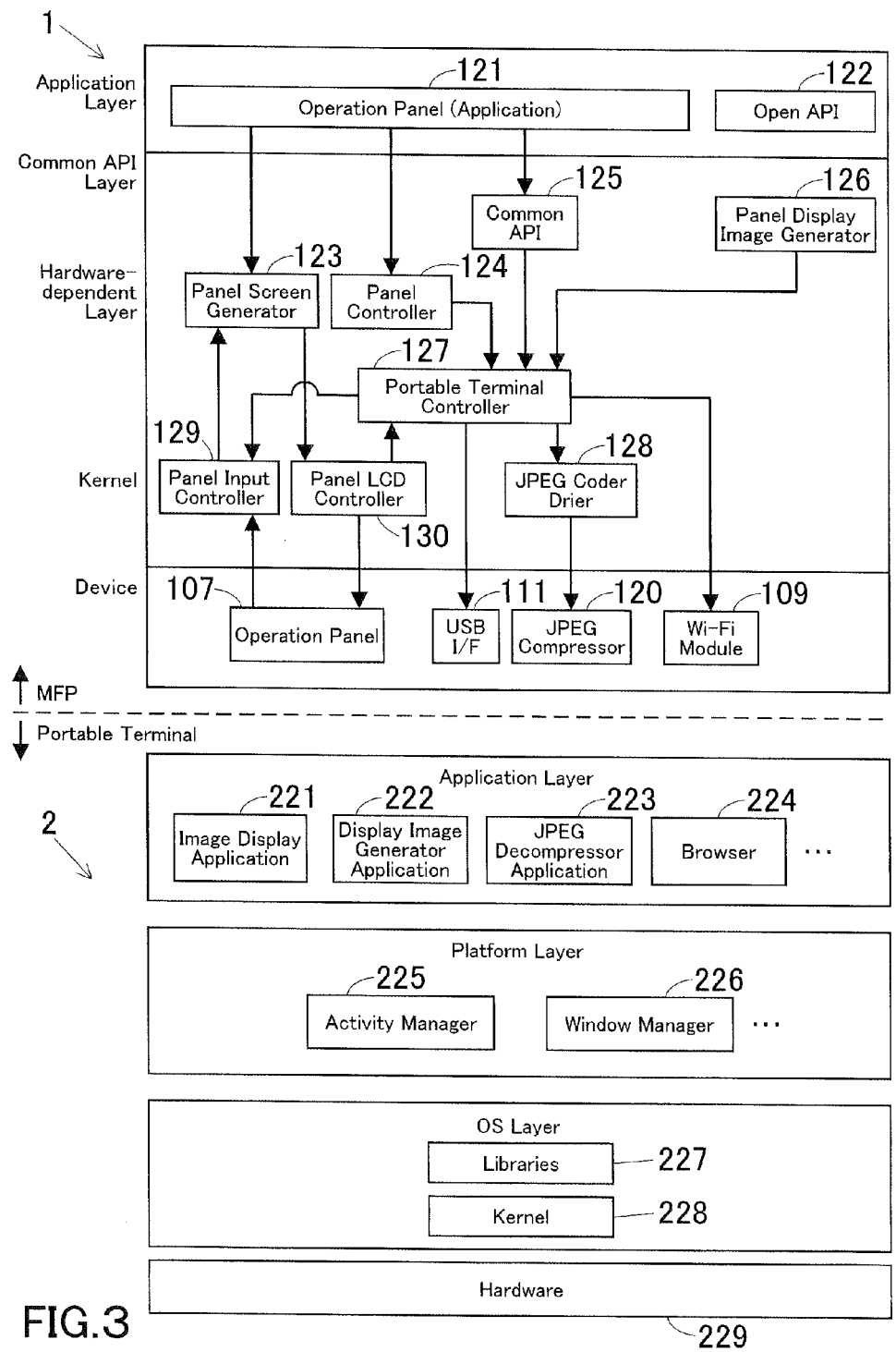
FIG. 3 is a block diagram illustrating a firmware configuration of the image processing apparatus and the portable terminal apparatus.

FIG. 3 is a block diagram illustrating a firmware configuration of the MFP 1 and the portable terminal 2.

The MFP 1 has: an application layer including an operation panel (application) 121, an open application program interface (open API) 122, and others; a common API layer including a common application program interface (common API) 125, a panel display image generator 126, and others; and a hardware-dependent layer including a panel screen generator 123, a panel controller 124, a portable terminal controller 127, and others.

The MFP 1 also has: a kernel layer including a panel input controller 129, a panel LCD controller 130, a JPEG coder driver 128, and others; and a device layer including an operation panel 107, an USB interface 111, a JPEG compressor 133, a Wi-Fi module 109, and others.

The panel screen generator 123 generates screen display data for the MFP 1, on the basis of which a remote screen will be displayed on the operation panel 107, when a user gives an instruction to start the cooperation from the portable terminal 2. In this embodiment, the panel screen generator 123 further moves the position of file processing buttons such as a print button, a delete button, and a transmit button and enlarges or reduces the file processing buttons, on the basis of display information received from the portable terminal 2. These operations will be later described in detail.

The panel controller 124 controls the conditions of communication with the operation panel 107 and also controls and others; the portable terminal controller 127 controls an interface for communicating with the portable terminal 2 and also controls others under the cooperation between the MFP 1 and the portable terminal 2.

The panel input controller 129 performs control of inputs via the operation panel 107; the panel LCD controller 130 performs display control of the display portion 107b of the operation panel 107. The JPEG compressor 133 compresses remote screen display data and others received from the portable terminal controller 127 by way of the JPEG codec driver 128, into JPEG form; the JPEG compressor 120 transmits the compressed data to the portable terminal 2 by way of the USB interface 111 and the Wi-Fi module 109.

The portable terminal 2 is composed of: an application layer including an image display application 221, an display image generator application 222, a JPEG decompressor application 223, and various applications such as a browser; a platform layer including various managers 225 and 226 and others; an OS layer including various libraries 227 and a kernel 228; and hardware 229.

The JPEG decompressor application 223 decompresses the compressed data received from the MFP 1.

The display image generator application 222 generates a screen that shows application icons each representing an application and others, so that the screen can be displayed on the display portion 204 of the portable terminal 2 along with a remote screen of the MFP 1.

The image display application 221 reproduces a screen of the MFP 1 as a remote screen on the basis of remote screen display data that is received from the MFP 1 and decompressed by the JPEG decompressor application 223, so that the screen can be displayed on the display portion 204.

In this embodiment, the image display application 221, the display image generator application 222, and the JPEG decompressor application 223 are configured to achieve one of the functions of the cooperation application.

Hereinafter, operations of the MFP 1 and the portable terminal 2, which are performed under the cooperation between them, will be described.

Here, a user is trying to establish a wireless network access to the MFP 1 from the portable terminal 2 to perform operations under the cooperation between the MFP 1 and the portable terminal 2. The user starts the cooperation between the MFP 1 and the portable terminal 2 by activating a cooperation application installed on the portable terminal 2.

FIG. 4 illustrates the relationship among software applications of the MFP 1 and the portable terminal 2; the software applications of the MFP 1 are shown on the left side and the software applications of the portable terminal 2 are shown on the right side.

The cooperation application of the portable terminal 2 is positioned between an OS of the portable terminal 2 and software applications that are general-purpose software; the cooperation application is allowed to: obtain operation information of users, data exchanged with the portable terminal 2, and remote screen display data of the portable terminal 2; and transmit the data to the MFP 1 when necessary. More specifically, the cooperation application of the portable terminal 2 accepts user instructions on the portable terminal 2, for example, accepts activating an application, receives remote screen display data from the MPF 1 and displays a screen (executes operation screen processing on the portable terminal), and executes cooperation-related processing and other processing. The cooperation-related processing is, for example, transmitting operation information indicating details of user operation, to the MFP 1.

If the MFP 1 is allowed to obtain all necessary information anytime because its OS and its software applications are all designed or customized in-house, the cooperation application of the MFP 1 does not necessarily have to be positioned between OS and software applications, i.e.; the cooperation application of the MFP 1, which is completely independent of the OS and the software applications, can obtain all necessary information by communicating with the OS and the software applications. The cooperation application of the MFP 1 accepts user instructions on the MFP 1, for example, instructions for activating an application; transmits remote screen display data for reproducing a screen of the MFP 1 (executes operation screen processing on the MFP); and executes cooperation-related processing and other processing. The cooperation-related processing is, for example, receiving operation information and others from the portable terminal 2 and executing a job.

When a user gives an instruction to start the MFP cooperation by touching a cooperation icon on the display portion 204 of the portable terminal 2, the cooperation application of the portable terminal 2 activates the cooperation application of the MFP 1 and transmits a request for remote screen display data, by communicating with the MFP 1 that is registered in advance. Subsequently, the cooperation mode is turned on; an operation screen of the MFP 1 is displayed both on the display portion 105a of the MFP 1 and the display portion 204 of the portable terminal 2. Here, the operation screen does not necessarily have to be displayed on the display portion 105a of the MFP 1.

Hereinafter, an operation of the cooperative image processing system of FIG. 1 will be further described.

Figure 5:
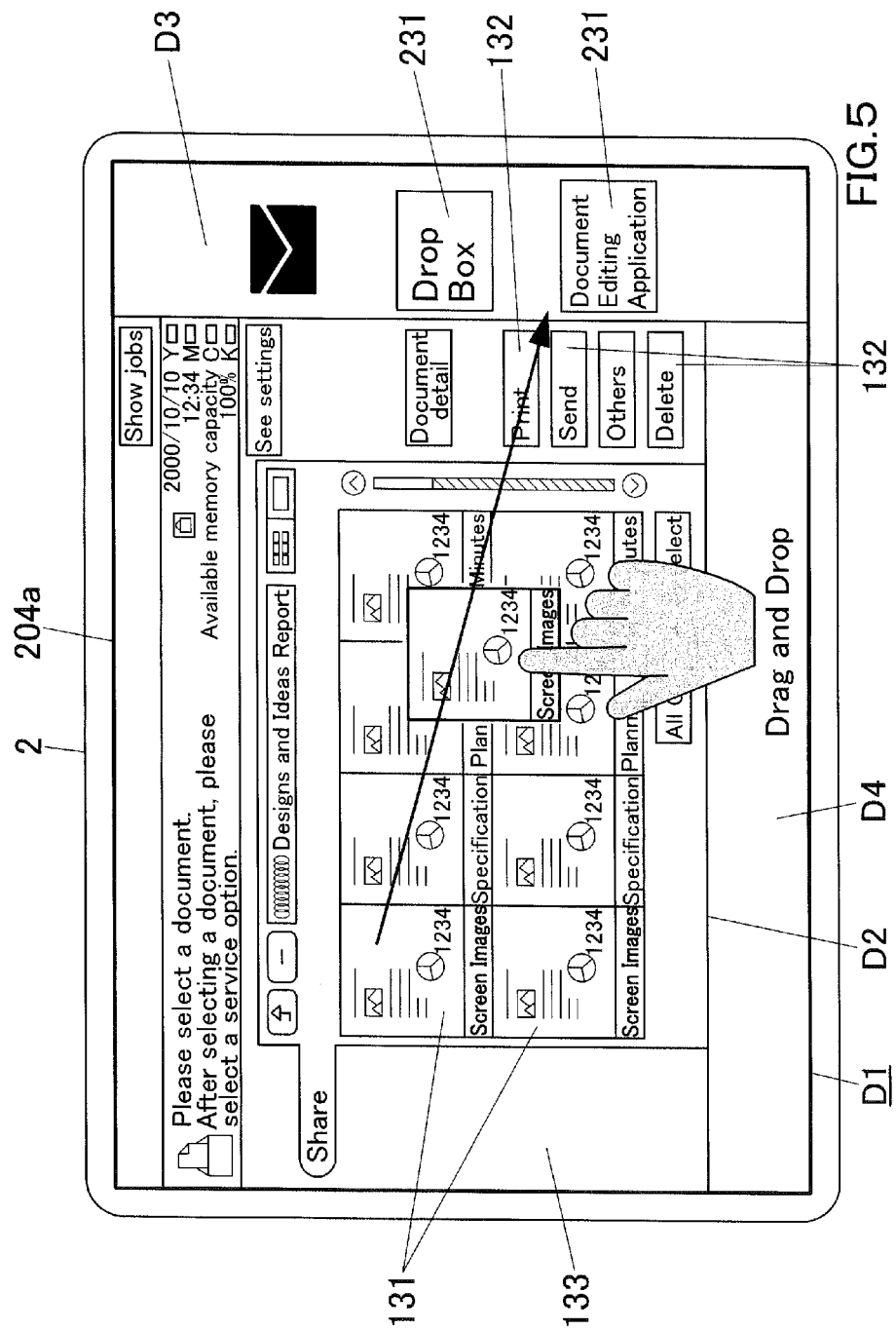
FIG. 5 illustrates a display portion of the portable terminal apparatus which shows a remote screen of the image processing apparatus along with application icons representing applications installed on the portable terminal apparatus.

FIG. 5 illustrates a display portion of the portable terminal 2 which shows a remote screen of the MFP 1 along with application icons of the portable terminal 2.

In the example of FIG. 5, a screen D1 is an area enclosed by a heavy line; a remote screen D2 is an area occupying an upper-left great portion of the screen D1; an application icon display field D3, which is vertically long, appears at the right on the screen D1; an unoccupied display field D4, which is horizontally long, appears below the remote screen D2.

Furthermore, a plurality of file buttons 131 are arranged on the remote screen D2; file processing buttons 132 such as a "print" button, a "send" button, and "delete" button are arranged on the right side of the remote screen D1; an unoccupied display field 133 appears on the left side of the remote screen D1.

The file buttons 131 are icons representing document files (including image files) stored on the memory 106 of the MFP 1. The file processing buttons 132 are icons onto which the file buttons 131 can be dragged and dropped with a user fingertip touch as indicated in FIG. 5; when a user drags the file button 131 and drops it onto the file processing button 132 with a fingertip touch, the corresponding document file is printed, transmitted, or deleted, for example.

On or more application icons 231 are shown in the application icons display field D3. The application icons 231 are icons representing applications installed on the portable terminal 2; when a user drags the file button 131 on the remote screen D2 and drops it onto the application icon 231 with a fingertip touch, an application corresponding to the application icon 231 is activated to execute predetermined processing on the document file.

On the above-mentioned screen of FIG. 5, the file processing buttons 132 on the remote screen D2 are very close to the application icons 231 in the application icons display field D2; when a user intends to drop the file button 131 onto the application icon 231, the user may drop it onto the file processing button 132 by mistake. Reversely, when a user intends to drop the file button 131 onto the file processing button 132, the user may drop it onto the application icon 231 by mistake. Furthermore, while a fingertip is on the file processing button 132, the file button 131 may overlap the application icon 231; in such a case, it may be wrongly judged that the user drops it onto the application icon 231.

Figure 6:
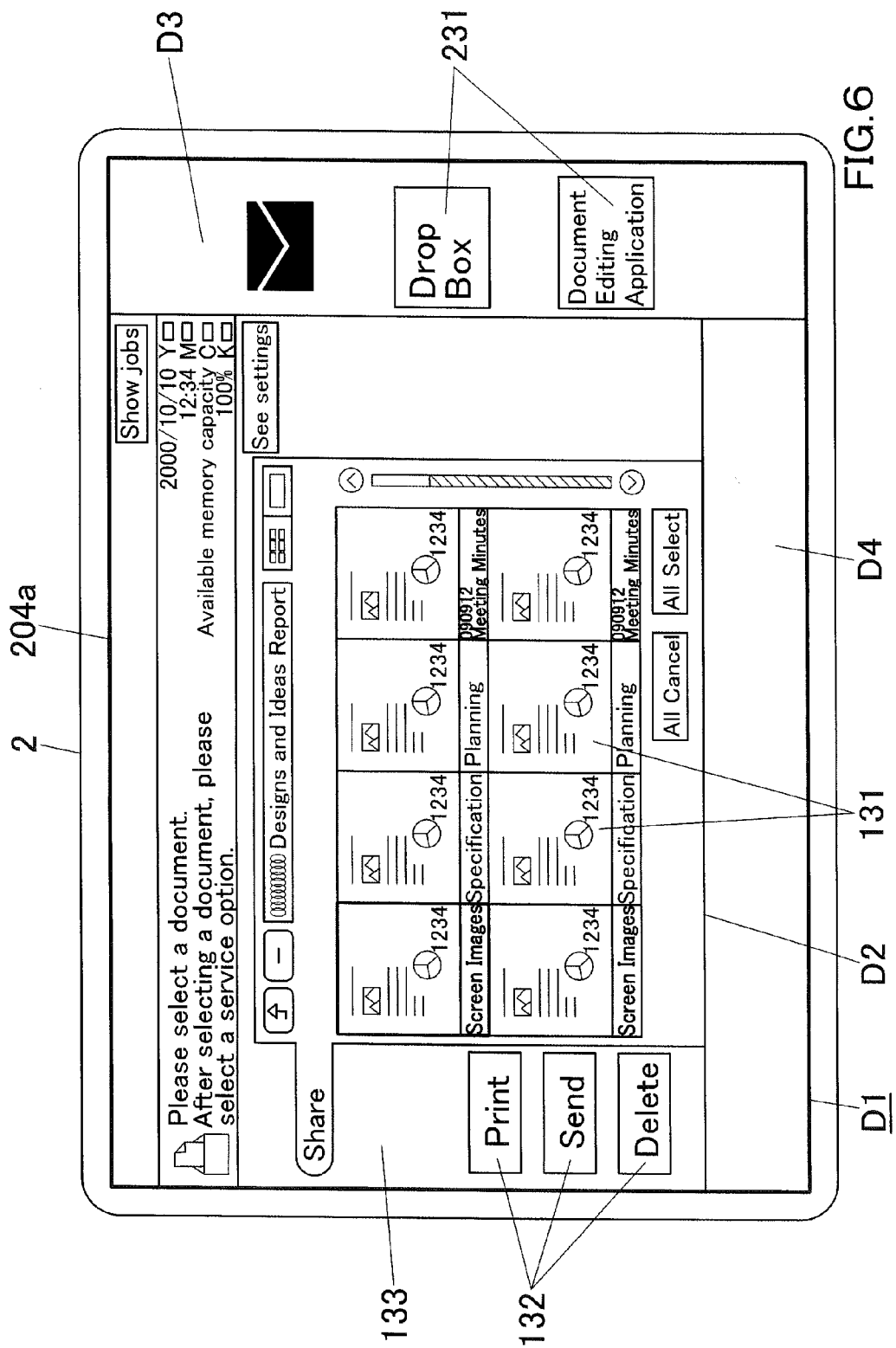
FIG. 6 is a view illustrating a remote screen on which file processing buttons are arranged further away from the application icons.

As a solution to such a problem, in this embodiment, the MFP 1 edits remote screen display data such that the file processing buttons 132 are arranged further away from the application icons 231 as illustrated in FIG. 6, and transmits the edited remote screen display data to the portable terminal 2. More specifically, the MFP 1 obtains display information of the screen D1, which includes display position information of the application icons 231, from the portable terminal 2, and moves the file processing buttons 132 into an unoccupied display field of the remote screen D2 on the basis of the display position of the application icons 231. The display information of the screen D1, which is obtained from the portable terminal 2 as described above, further may include display position information of the remote screen D2 and the application icons display field D3, and others.

With the aforementioned solution, a distance between the file processing buttons 132 on the remote screen D2 and the application icons 231 of the portable terminal 2 is extended on a remote screen displayed on the portable terminal 2 on the basis of the remote screen display data received from the MFP 1. As a consequence, when a user intends to drag the file button 131 on the remote screen D2 to drop it onto the application icon 231, the user hardly would drop it onto the file processing button 131 by mistake; or when a user intends to drag the same to drop it onto the file processing button 131, the user hardly would drop it onto the application icon 231 by mistake. Furthermore, while a fingertip is on the file processing button 132, the file button 131 may overlap the application icon 231; in such a case, with the aforementioned solution, it would not be wrongly judged any more that the user drops it onto the application icon 231.

Figure 7:
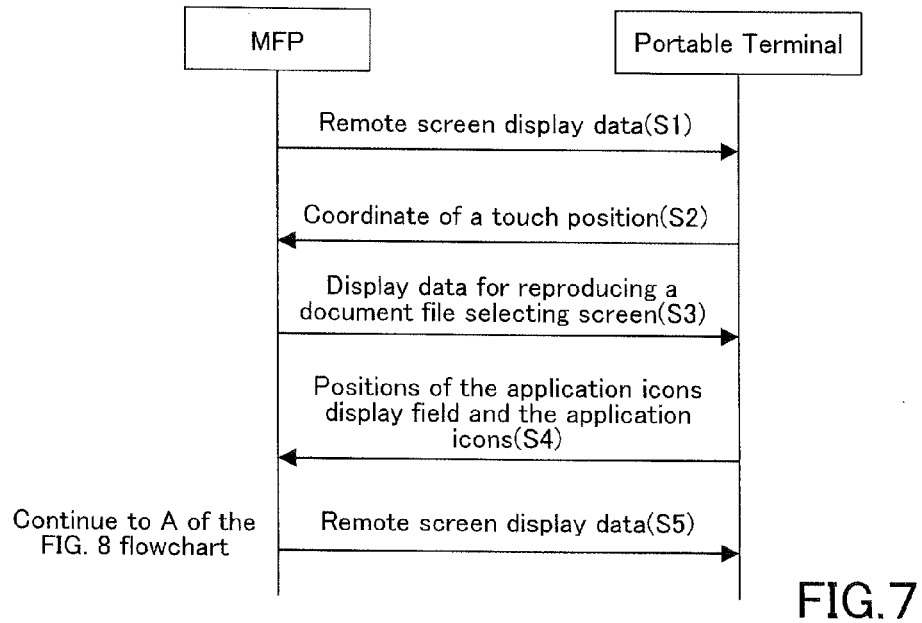
FIG. 7 is a sequence diagram illustrating operations of the image processing apparatus and the portable terminal apparatus, which are performed in the embodiment of FIG. 6.

FIG. 7 is a sequence diagram illustrating operations of the MFP 1 and the portable terminal 2, which are performed in the embodiment of FIG. 6.

The MFP 1 transmits remote screen display data (an initial screen) in response to a request for the screen from the portable terminal 2 (Step S1); the portable terminal 2 displays a remote screen. When a user touches on the remote screen on the portable terminal 2 to give instructions to show a document file selecting and processing screen, the portable terminal 2 transmits the coordinate of the touch position to the MFP 1 (Step S2).

The MFP 1 judges that it is a request for a document file selecting and processing screen by analyzing the coordinate, then transmits display data for reproducing the screen to the portable terminal 2 (Step S3). Meanwhile, the portable terminal 2 transmits display information including display position information of the application icons display field D3 and the application icons 231 to the MFP 1 (Step S4).

Upon receiving the display information, the MFP 1 edits the display data for reproducing the document file selecting and processing screen by moving the position of the file processing buttons 132 thereon, then transmits the edited screen display data to the portable terminal 2 (Step S5).

Figure 8:
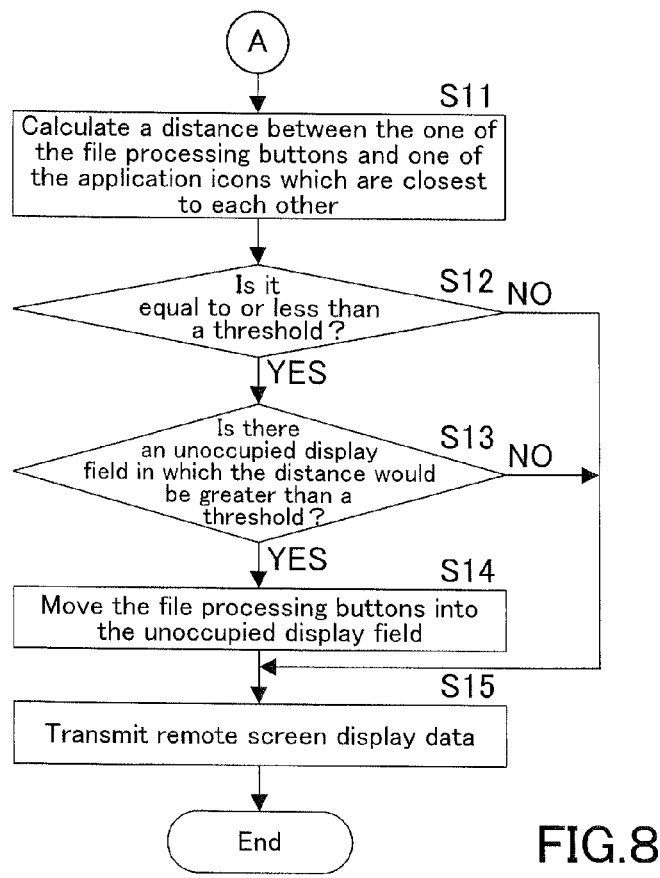
FIG. 8 is a flowchart representing an operation of the image processing apparatus, which is editing display data of a remote screen.

FIG. 8 is a flowchart representing an operation of the MFP 1, which is editing remote screen display data. The flowchart of FIG. 8 and the following flowcharts are executed by the CPU 101 of the MFP 1 or the CPU 201 of the portable terminal 2 in accordance with operation programs.

By the CPU 101 of the MFP 1, a distance between one of the file processing buttons 132 and one of the application icons 231 which are closest to each other is calculated on the basis of the display information received, in Step S11.

In Step S12, it is judged whether or not the calculated distance is equal to or less than a threshold. If it is equal to or less than a threshold (YES in Step S12), the flowchart proceeds to Step S13. If it is not equal to or less than a threshold (NO in Step S12), the user hardly would drop a button at an unintended position by mistake, thus the file processing buttons 132 stay immobile; then the flowchart proceeds to Step S15.

In Step S13, it is judged whether or not the remote screen display data has an unoccupied display field as a destination, in which a distance between one of the file processing buttons 132 and one of the application icons 231, which are closest to each other, would be greater than a threshold. If it does not have an unoccupied display field (No in Step S13), the flowchart proceeds to Step S15.

If it has an unoccupied display field (YES in Step S13), the file processing buttons 132 are moved into the unoccupied display field in Step S15; then the flowchart proceeds to Step S15.

In Step S15, the edited remote screen display data is transmitted to the portable terminal 2.

Figure 9:
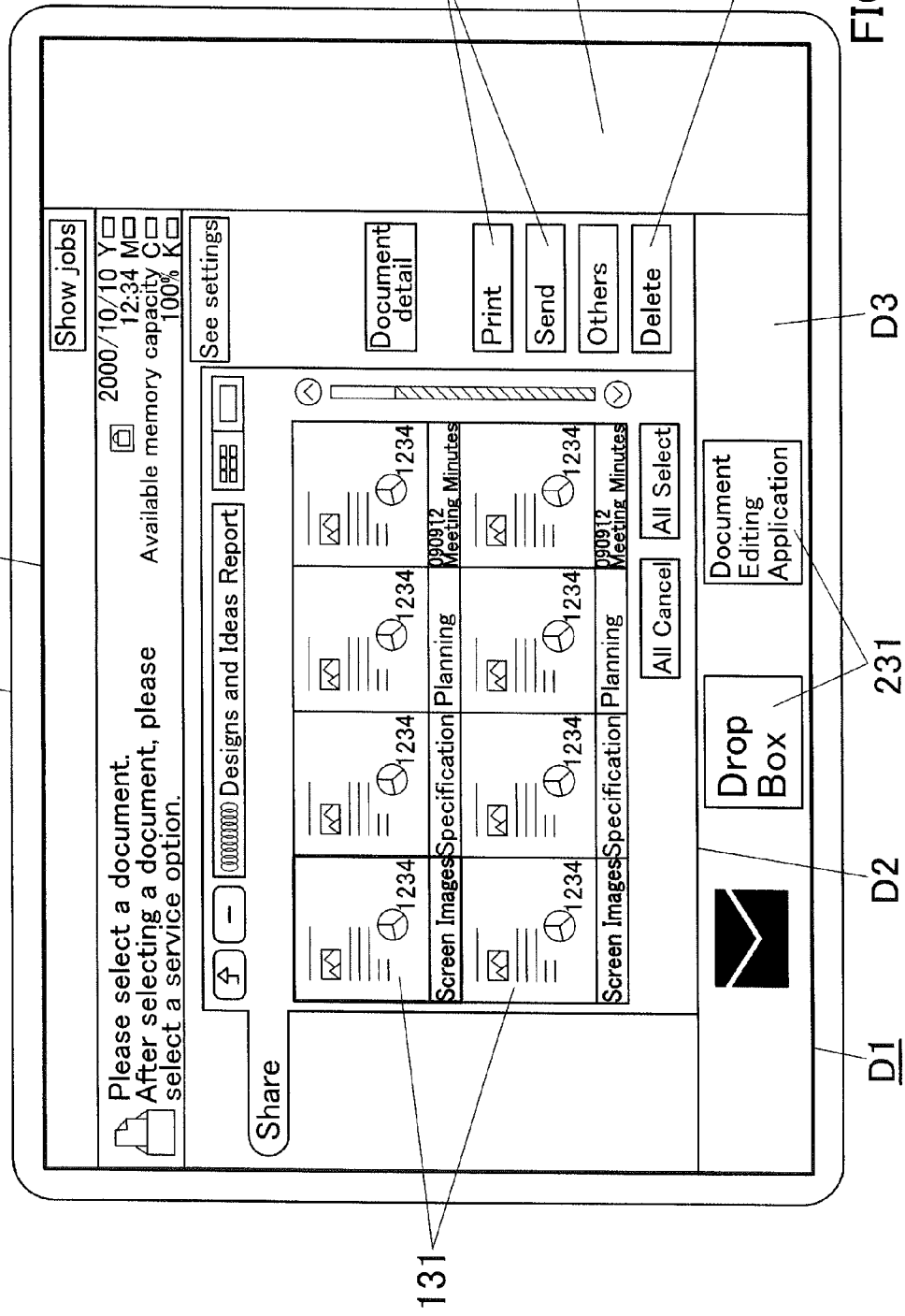
FIG. 9 is a view illustrating a screen on which the position of an application icons display field is moved.

FIG. 9 illustrates another embodiment of the present invention.

In the embodiment of FIGS. 6-8, the MFP 1 moves the file processing buttons 132 in order to extend a distance between the file processing buttons 132 and the application icons 231; meanwhile, in the embodiment of FIG. 9, the portable terminal 2 moves the application icons display field D3.

More specifically, the portable terminal 2 obtains the remote screen display data and display position information of the file processing buttons 132 on the screen, from the MFP 1; and if the application icons 231 are too close to the file processing buttons 132, the portable terminal 2 extends a distance between the file processing buttons 132 and the application icons 231 by moving the position of the application icons display field D3, on the basis of the information received therefrom.

In the example of FIG. 9, the application icons display field D3 has been moved into the unoccupied display field D4 that is positioned on the lower end of the remote screen D2; another unoccupied display field D4, which is vertically long, appears on the right side of the remote screen D2.

In the embodiment of FIG. 9, a distance between the file processing buttons 132 on the remote screen D2 and the application icons 231 of the portable terminal 2 is extended. As a consequence, when a user intends to drag the file button 131 on the remote screen D2 to drop it onto the application icon 231, the user hardly would drop it onto the file processing button 132 by mistake; or when a user intends to drag the same to drop it onto the file processing button 132, the user hardly would drop it onto the application icon 231 by mistake.

Furthermore, while a fingertip is on the file processing button 132, the file button 131 may overlap the application icon 231; in such a case, with the aforementioned solution, it would not be wrongly judged any more that the user drops it onto the application icon 231.

Figure 10:
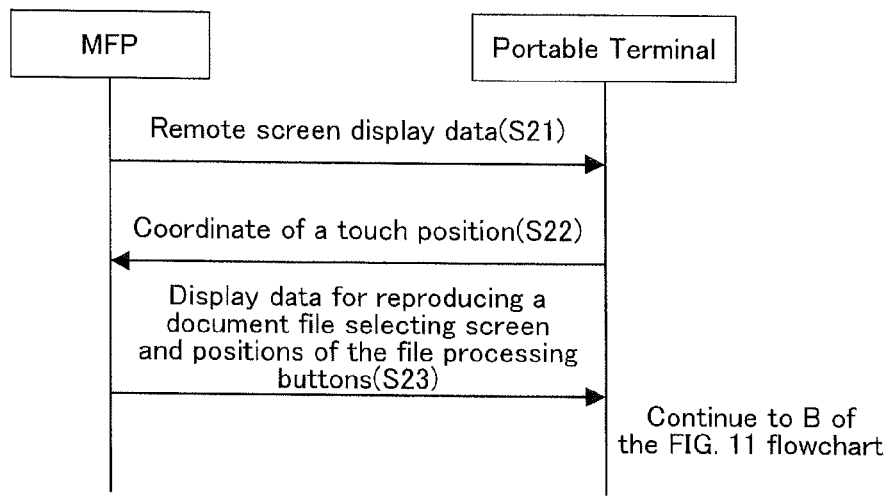
FIG. 10 is a sequence diagram illustrating operations of the image processing apparatus and the portable terminal apparatus, which are performed in the embodiment of FIG. 9.

FIG. 10 is a sequence diagram illustrating operations of the MFP 1 and the portable terminal 2, which are performed in the embodiment of FIG. 9.

The MFP 1 transmits remote screen display data (an initial screen) (Step S21); the portable terminal 2 displays a remote screen. When a user touches on the remote screen on the portable terminal 2 to give instructions to show a document file selecting and processing screen, the portable terminal 2 transmits the coordinate of the touch position to the MFP 1 (Step S22).

The MFP 1 judges that it is a request for a document file selecting and processing screen by analyzing the coordinate, then transmits display data for reproducing the screen and display position information of the file processing buttons 132 to the portable terminal 2 (Step S23).

After receiving the data, the portable terminal 2 moves the application icons display field D3 and display it at a different position along with the remote screen, as described with reference to the flowchart of FIG. 11.

Figure 11:
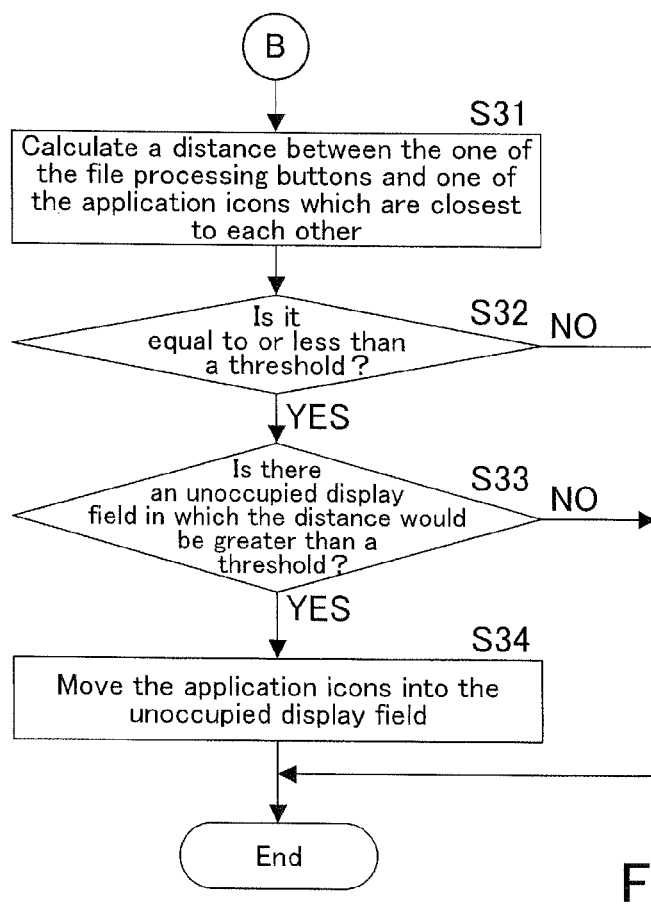
FIG. 11 is a flowchart representing an operation of the portable terminal apparatus, which is moving the position of the application icons display field.

FIG. 11 is a flowchart representing an operation of the portable terminal 2, which is moving the position of the application icons display field.

By the CPU 201 of the portable terminal 2, a distance between one of the file processing buttons 132 and one of the application icons 231 which are closest to each other is calculated on the basis of the information received, in Step S31.

In Step S32, it is judged whether or not the calculated distance is equal to or less than a threshold. If it is equal to or less than a threshold (YES in Step S32), the flowchart proceeds to Step S33. If it is not equal to or less than a threshold (NO in Step S32), the user hardly would drop a button at an unintended position by mistake, thus the application icons display field D3 stays immobile; then the flowchart terminates.

In Step S33, it is judged whether or not there is an unoccupied display field as a destination, in which a distance between one of the file processing buttons 132 and one of the application icons 231, which are closest to each other, would be greater than a threshold. If there is not an unoccupied display field (NO in Step S33), the flowchart terminates.

If there is an unoccupied display field (YES in Step S33), the application icons display field D3 is moved into the unoccupied display field in Step S34.

In the embodiment of FIGS. 9-11, the portable terminal 2 moves the position of the entire application icons display field D3; alternatively, the portable terminal 2 may move the position of a part of the application icons 231.

Figure 12:
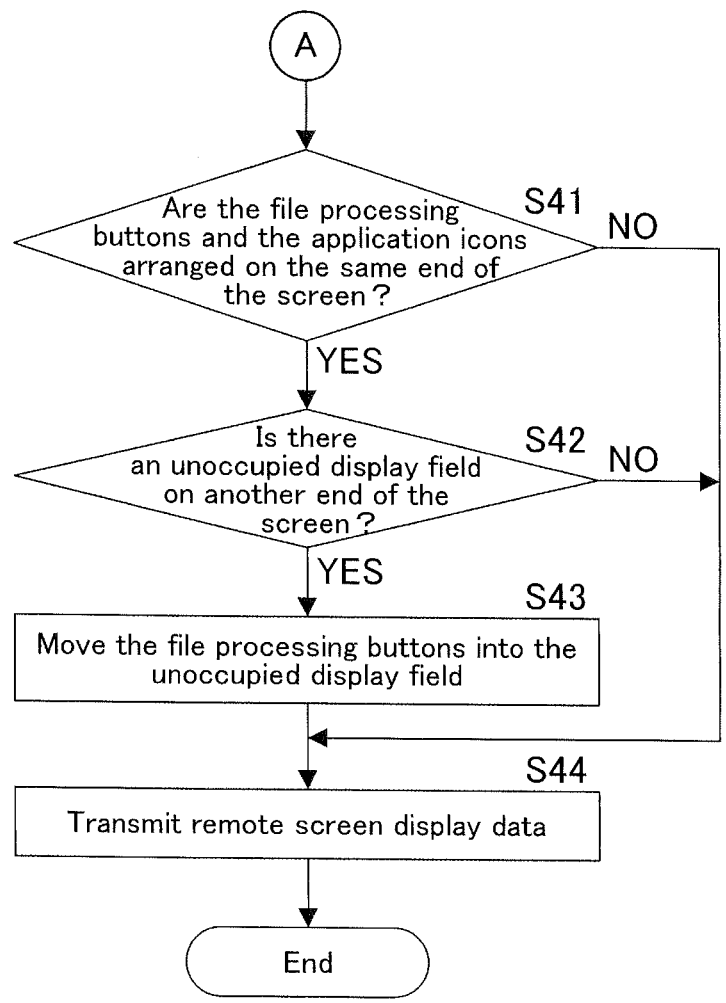
FIG. 12 is yet another embodiment of the present invention, illustrating a flowchart representing an operation of the information processing apparatus.

FIG. 12 is a flowchart representing yet another embodiment of the present invention.

In the embodiment of FIGS. 6-8, the MFP 1 calculates a distance between one of the file processing buttons 132 and one of the application icons 231, which are closest to each other; meanwhile, in the embodiment to be described below, the MFP 1 judges whether or not the file processing buttons 132 and the application icons display field D3 are arranged on the same end of the display screen D1 of the portable terminal 2 and moves the position of the file processing buttons 132 if necessary.

By the CPU 101 of the MFP 1, it is judged whether or not the file processing buttons 132 and the application icons display field D3 of the portable terminal 2 are arranged on the same end of the screen, in Step S41. If these are arranged on the same end of the screen (YES in Step S41), the flowchart proceeds to Step S42. If these are not arranged on the same end of the screen (NO in Step S41), the user hardly would drop a button at an unintended position by mistake, thus the file processing buttons 132 stay immobile; then the flowchart proceeds to Step S44.

In Step S42, it is judged whether or not the remote screen display data has an unoccupied display field as a destination, on an end other than the end on which the file processing buttons 132 are arranged. If it does not have an unoccupied display field (No in Step S42), the flowchart proceeds to Step S44.

If it has an unoccupied display field (YES in Step S42), the file processing buttons 132 are moved into the unoccupied display field in Step S43; then the flowchart proceeds to Step S44.

In Step S44, the edited remote screen display data is transmitted to the portable terminal 2.

As is understood from the above, it is judged whether or not the file processing buttons 132 and the application icons display field D3 are arranged on the same end of the screen, and the position of the file processing buttons 132 is moved depending on the result of the judgment. This makes the processing very simple in comparison with the other case in which a distance between the file processing buttons 132 and the application icons display field D3 is calculated.

In the example of FIG. 12, the MFP 1 makes a judgment about the positions of the file processing buttons 132 and the application icons display field D3; alternatively, the portable terminal 2 may judge whether or not the file processing buttons 132 and the application icons display field D3 are arranged on the same end of the display screen D1, and move the application icons display field D3 into an unoccupied display field if these are arranged on the same end.

Figure 13:
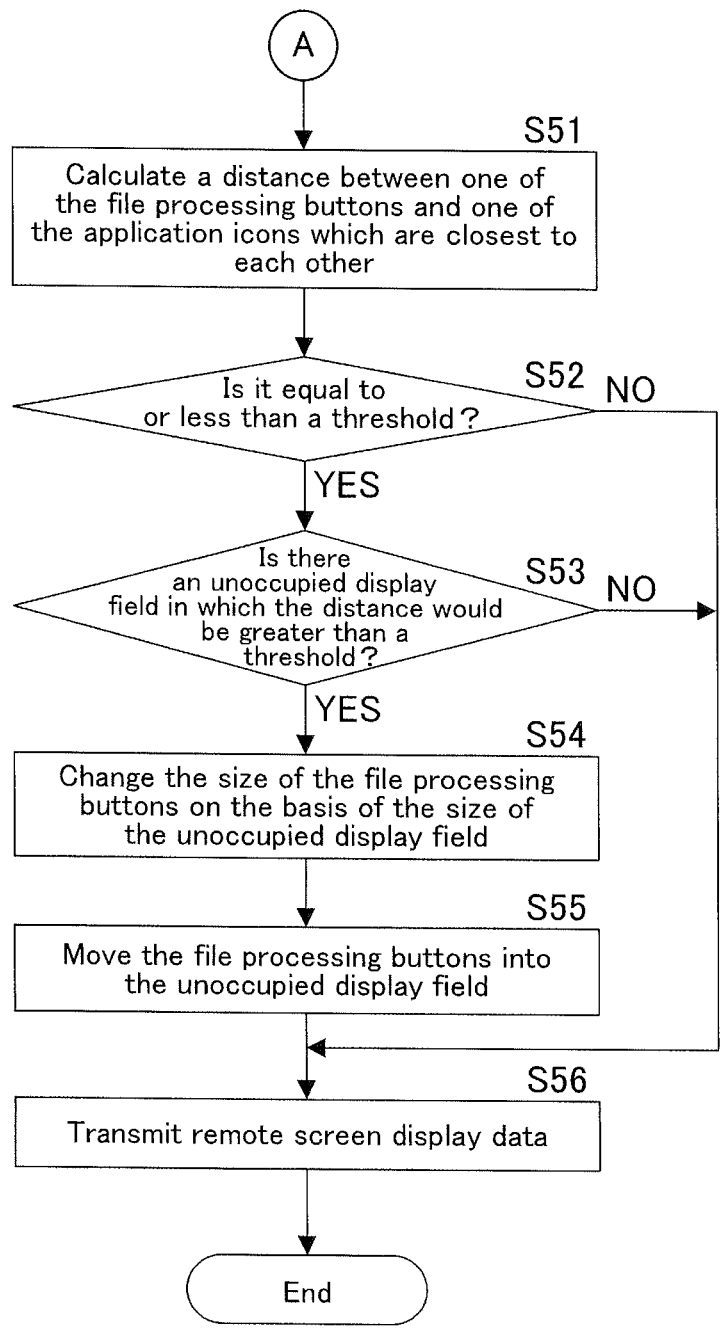
FIG. 13 is still yet another embodiment of the present invention, illustrating a flowchart representing an operation of the information processing apparatus.

FIG. 13 is a flowchart representing still yet another embodiment of the present invention. In this embodiment, the MFP 1 changes the size of the file processing buttons 132 on the basis of the size of an unoccupied display field, when moving the position of the file processing buttons 132.

By the CPU 101 of the MFP 1, a distance between one of the file processing buttons 132 and one of the application icons 231 which are closest to each other is calculated on the basis of the display information received, in Step S51.

In Step S52, it is judged whether or not the calculated distance is equal to or less than a threshold. If it is equal to or less than a threshold (YES in Step S52), the flowchart proceeds to Step S53. If it is not equal to or less than a threshold (NO in Step S52), the user hardly would drop a button at an unintended position by mistake, thus the file processing buttons 132 stay immobile; then the flowchart proceeds to Step S56.

In Step S53, it is judged whether or not the remote screen display data has an unoccupied display field as a destination, in which a distance between one of the file processing buttons 132 and one of the application icons 231, which are closest to each other, would be greater than a threshold. If it does not have an unoccupied display field (No in Step S53), the flowchart proceeds to Step S56.

Figure 14:
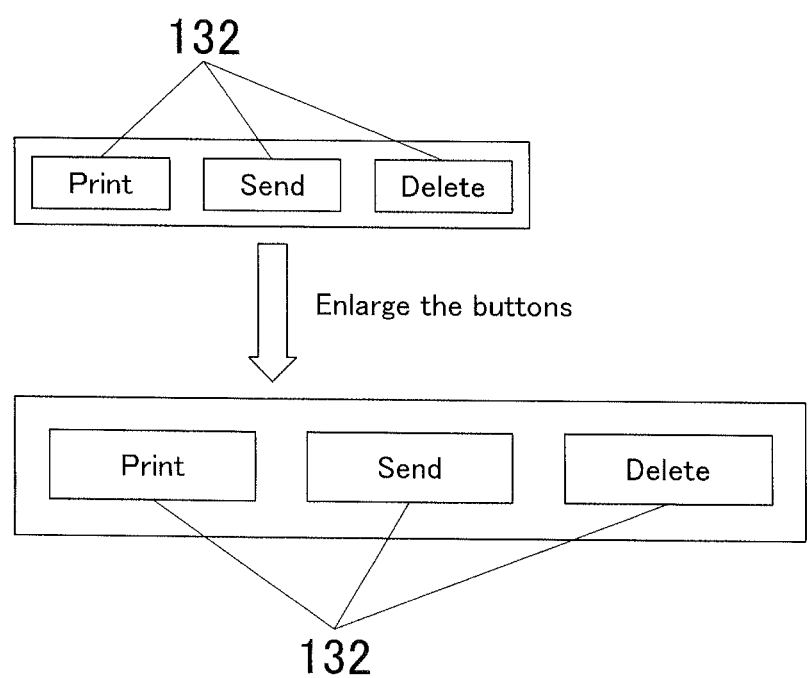
FIG. 14 is a view illustrating a screen on which the size of file processing buttons are enlarged.

If it has an unoccupied display field (YES in Step S53), the size of the file processing buttons 132 is changed on the basis of the size of the unoccupied display field in Step S54. For example, the size of the file processing buttons 132 is enlarged as illustrated in FIG. 14. The size of the file processing buttons 132 can be reduced when the size of the unoccupied display field is small.

In Step S55, the file processing buttons 132 are moved into the unoccupied display field; then in Step S56, the edited remote screen display data is transmitted to the portable terminal 2.

As is understood from the above, the size of the file processing buttons 132 are changed on the basis of the size of an unoccupied display field that is to be a destination of the file processing buttons 132. This makes the file processing buttons 132 appear in an appropriate size for the size of the unoccupied display field while keeping a distance between the file processing buttons 132 and the application icons 231.

In the example of FIG. 14, all the file processing buttons 132 are enlarged and the position thereof is moved; however, depending on the size of the unoccupied display field, the position of all the enlarged file processing buttons 132 cannot be moved.

As a solution to such a problem, it is preferred to set priorities on the file processing buttons 132 in advance such that the file processing buttons 132 are moved into an unoccupied display field in the order of decreasing priority.

Figure 15:
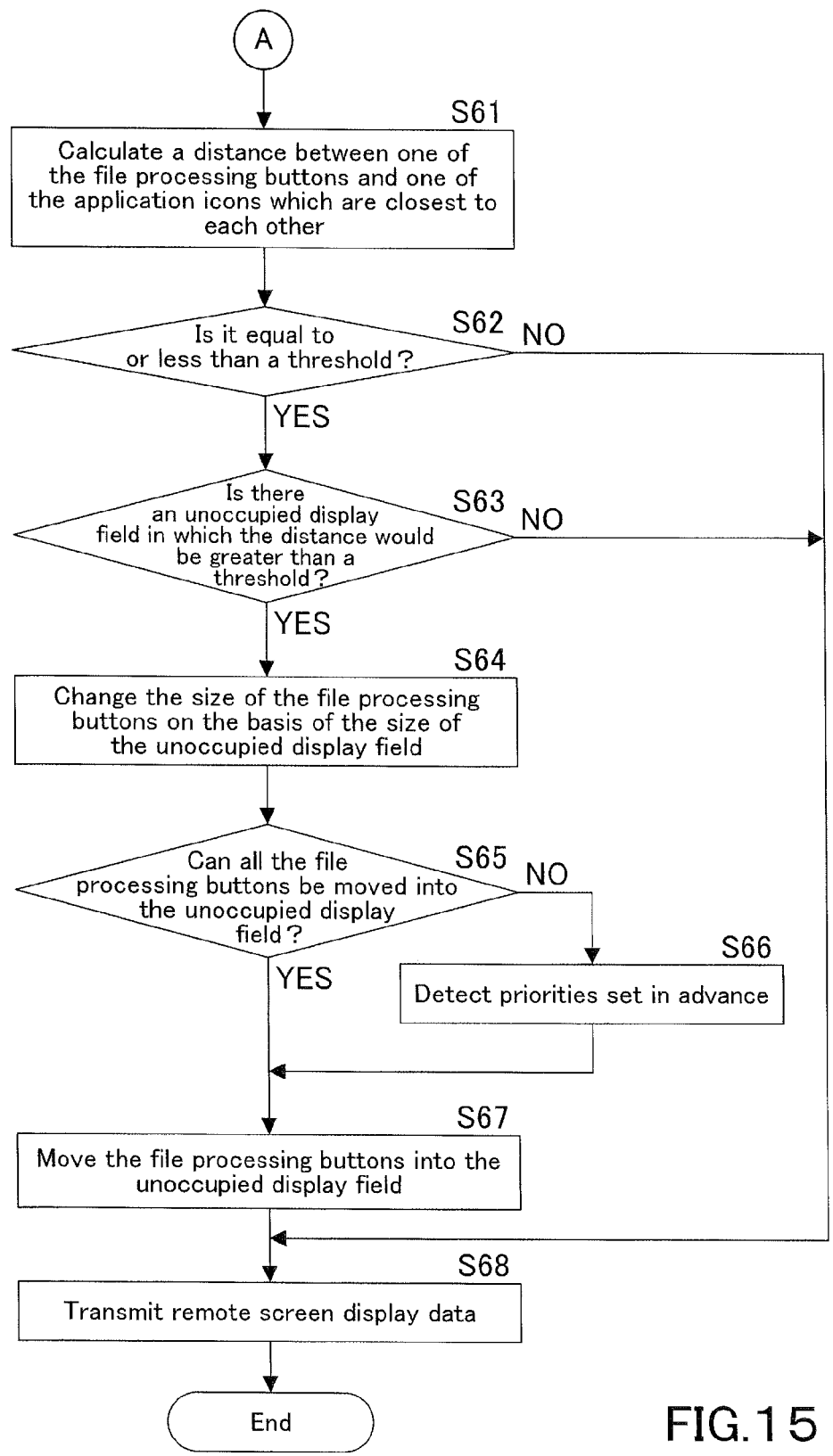
FIG. 15 is a flowchart representing the operation of moving file processing buttons into an unoccupied display field in the order of decreasing priority.

FIG. 15 is a flowchart representing the operation of moving the file processing buttons into an unoccupied display field in the order of decreasing priority.

By the CPU 101 of the MFP 1, a distance between one of the file processing buttons 132 and one of the application icons 231 which are closest to each other is calculated on the basis of the display information received, in Step S61.

In Step S62, it is judged whether or not the calculated distance is equal to or less than a threshold. If it is equal to or less than a threshold (YES in Step S62), the flowchart proceeds to Step S63. If it is not equal to or less than a threshold (NO in Step S62), the user hardly would drop a button at an unintended position by mistake, thus the file processing buttons 132 stay immobile; then the flowchart proceeds to Step S68.

In Step S63, it is judged whether or not the remote screen display data has an unoccupied display field as a destination, in which a distance between one of the file processing buttons 132 and one of the application icons 231, which are closest to each other, would be greater than a threshold. If it does not have an unoccupied display field (No in Step S63), the flowchart proceeds to Step S68.

If it has an unoccupied display field (YES in Step S63), the size of the file processing buttons 132 is changed on the basis of the size of the unoccupied display field in Step S64.

Subsequently, it is judged in Step S65 whether or not all the file processing buttons 132 can be moved into the unoccupied display field; if all of them can be moved (YES in Step S65), the flowchart directly proceeds to Step S67. If all of them cannot be moved (NO in Step S65), priorities set in advance on the file processing buttons 132 are detected in Step S66; then the flowchart proceeds to Step S67.

In Step S67, the file processing buttons 132 are moved into the unoccupied display field; then in Step S56, the edited remote screen display data is transmitted to the portable terminal 2.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
   a connector that connects the image processing apparatus to a portable terminal apparatus;
   a transmitter that transmits a screen data to the portable terminal apparatus, wherein,
      the screen data corresponds to a first screen allowing manipulation of the image processing apparatus from the portable terminal apparatus,
      the first screen displays a file processing button and a file icon to be dropped onto the file processing button or onto an application icon displayed on a second screen, and
      the file icon represents a document file;
   a receiver that receives a display information from the portable terminal apparatus, wherein,
      the display information includes a display position information that represents a position of the application icon on the second screen, and
      the second screen is displayed on a display portion of the portable terminal apparatus; and
   a display data generator that generates the screen data based on the display information by moving a position of the file processing button on the first screen farther away from the application icon, while the first screen and the second screen are both displayed on the display portion of the portable terminal apparatus.

2. The image processing apparatus as recited in claim 1, wherein the display data generator generates the screen data by moving the position of the file processing button on the first screen while the first screen and the second screen are both displayed on the display portion of the portable terminal apparatus, if a distance between the file processing button and the application icon is equal to or less than a predetermined threshold.

3. The image processing apparatus as recited in claim 1, wherein:
   the application icon is displayed in an icon display field of the second screen;
   the receiver further receives the display position information from the portable terminal apparatus, wherein the display position information represents a position of the icon display field; and
   the display data generator generates the screen data by moving the position of the file processing button on the first screen while the first screen and the second screen are both displayed on the display portion of the portable terminal apparatus, if the file processing button on the first screen and the icon display field of the second screen are arranged on a same end of the display portion of the portable terminal apparatus.

4. The image processing apparatus as recited in claim 1, wherein the display data generator generates the screen data by changing the size of the file processing button based on the size of an unoccupied display field as a destination of the file processing button.

5. The image processing apparatus as recited in claim 4, wherein:
   the file processing button is one of a plurality of file processing buttons displayed on the first screen; and
   the display data generator generates the screen data by moving the position of the file processing buttons in the order of predetermined priorities, if all the file processing buttons cannot be moved into the unoccupied display field, wherein all the file processing buttons are changed in size based on the size of the unoccupied display field.

6. The image processing apparatus as recited in claim 1, wherein the first screen allows manipulation of the image processing apparatus remotely from the portable terminal apparatus.

7. The image processing apparatus as recited in claim 1, wherein:
   the file processing button on the first screen represents a function of the image processing apparatus; and
   when the file icon is dropped onto the file processing button on the first screen, the image processing apparatus executes the function on the document file represented by the file icon, wherein the function is represented by the file processing button.

8. A portable terminal apparatus comprising:
   a connector that connects the portable terminal apparatus to the image processing apparatus;
   a display portion that displays a first screen and a second screen, wherein,
      the first screen allows manipulation of the image processing apparatus from the portable terminal apparatus,
      the first screen displays a file processing button and a file icon to be dropped onto the file processing button or onto an application icon displayed on the second screen, and
      the file icon represents a document file;
   a receiver that receives a screen data and a display position information from the image processing apparatus, wherein,
      the screen data corresponds to the first screen, and
      the display position information represents a position of the file processing button on the first screen; and a display controller that moves a position of the application icon on the second screen, based on the display position information, farther away from the file processing button, while the first screen and the second screen are both displayed on the display portion.

9. The portable terminal apparatus as recited in claim 8, wherein the display controller moves the position of the application icon on the second screen while the first screen and the second screen are both displayed on the display portion, if a distance between the file processing button and the application icon is equal to or less than a predetermined threshold.

10. The portable terminal apparatus as recited in claim 8, wherein:
    the application icon is displayed in an icon display field of the second screen; and
    the display controller moves the position of the application icon on the second screen while the first screen and the second screen are both displayed on the display portion, if the file processing button on the first screen and the icon display field area of the second screen are arranged on the same end of the display portion.

11. The portable terminal apparatus as recited in claim 8, wherein the first screen allows manipulation of the image processing apparatus remotely from the portable terminal apparatus.

12. The portable terminal apparatus as recited in claim 8, wherein:
    the file processing button on the first screen represents a function of the image processing apparatus; and
    when the file icon is dropped onto the file processing button on the first screen, the image processing apparatus executes the function on the document file represented by the file icon, wherein the function is represented by the file processing button.

13. A non-transitory computer-readable recording medium storing a program that causes an image processing apparatus to execute:
    connecting the image processing apparatus to a portable terminal apparatus;
    transmitting a screen data to the portable terminal apparatus, wherein
        the screen data corresponds to a first screen allowing manipulation of the image processing apparatus from the portable terminal apparatus,
        the first screen displays a file processing button and a file icon to be dropped onto the file processing button or onto an application icon displayed on a second screen, and
        the file icon represents a document file;
    receiving a display information from the portable terminal apparatus, wherein
        the display information includes a display position information that represents a position of the application icon on the second screen, and
        the second screen is displayed on a display portion of the portable terminal apparatus; and
    generating the screen data based on the display information by moving a position of the file processing button on the first screen farther away from the application icon, while displaying both the first screen and the second screen on the display portion of the portable terminal apparatus, wherein
    a transmitter of the image processing apparatus transmits the screen data to the portable terminal apparatus,
    a display data generator of the image processing apparatus generates the screen data, and
    a receiver of the image processing apparatus receives the display information.

14. The non-transitory computer-readable recording medium as recited in claim 13, wherein the display data generator generates the screen data by moving the position of the file processing button on the first screen while the first screen and the second screen are both displayed on the display portion of the portable terminal apparatus, if a distance between the file processing button and the application icon is equal to or less than a predetermined threshold.

15. The non-transitory computer-readable recording medium as recited in claim 13, wherein:
    the application icon is displayed in an icon display field of the second screen;
    the receiver further receives the display position information from the portable terminal apparatus, wherein the display position information represents a position of the icon display field; and
    the display data generator generates the screen data by moving the position of the file processing button on the first screen while the first screen and the second screen are both displayed on the display portion of the portable terminal apparatus, if the file processing button on the first screen and the icon display field of the second screen are arranged on a same end of the display portion of the portable terminal apparatus.

16. The non-transitory computer-readable recording medium as recited in claim 13, wherein the display data generator generates the screen data by changing the size of the file processing button based on the size of an unoccupied display field as a destination of the file processing button.

17. The non-transitory computer-readable recording medium as recited in claim 16, wherein:
    the file processing button is one of a plurality of file processing buttons displayed on the first screen; and
    the display data generator generates the screen data by moving the position of the file processing buttons in the order of predetermined priorities, if all the file processing buttons cannot be moved into the unoccupied display field, wherein all the file processing buttons are changed in size based on the size of the unoccupied display field.

18. The non-transitory computer-readable recording medium storing the program that generates the remote screen display data as recited in claim 13, wherein the first screen allows manipulation of the image processing apparatus remotely from the portable terminal apparatus.

19. The non-transitory computer-readable recording medium storing the program that generates the remote screen display data as recited in claim 13, wherein:
    the file processing button on the first screen represents a function of the image processing apparatus; and
    when the file icon is dropped onto the file processing button on the first screen, the image processing apparatus executes the function on the document file represented by the file icon, wherein the function is represented by the file processing button.

20. A non-transitory computer-readable recording medium storing a display control program that causes a portable terminal apparatus comprising a display portion to execute:
    connecting the portable terminal apparatus to an image processing apparatus;
    displaying a first screen and a second screen, wherein,
        the first screen allows manipulation of the image processing apparatus from the portable terminal apparatus, the first screen displays a file processing button and a file icon to be dropped onto the file processing button or onto an application icon displayed on the second screen, and the file icon represents a document file;

receiving a screen data and a display position information from the image processing apparatus, wherein, the screen data corresponds to the first screen, and the display position information represents a position of the file processing button on the first screen; and moving, by a display controller of the portable terminal apparatus, a position of the application icon on the second screen, based on the display position information, farther way from the file processing button, while the first screen and the second screen are both displayed on the display portion.

21. The non-transitory computer-readable recording medium as recited in claim 20, wherein the display controller moves the position of the application icon on the second screen while the first screen and the second screen are both displayed on the display portion, if a distance between the file processing button and the application icon is equal to or less than a predetermined threshold.

22. The non-transitory computer-readable recording medium as recited in claim 20, wherein:

the application icon is displayed in an icon display field of the second screen; and the display controller moves the position of the application icon on the second screen while the first screen and the second screen are both displayed on the display portion, if the file processing button on the first screen and the icon display field area of the second screen are arranged on the same end of the display portion.

23. The non-transitory computer-readable recording medium storing the display control program as recited in claim 20, wherein the first screen allows manipulation of the image processing apparatus remotely from the portable terminal.

24. The non-transitory computer-readable recording medium storing the display control program as recited in claim 20, wherein:

the file processing button on the first screen represents a function of the image processing apparatus; and when the file icon is dropped onto the file processing button on the first screen, the image processing apparatus executes the function on the document file represented by the file icon, wherein the function is represented by the file processing button.

\* \* \* \* \*